July 1, 1941.  H. TURIN ET AL  2,247,455
TIME CONTROLLED SETTING DEVICE
Filed July 14, 1937   7 Sheets-Sheet 1

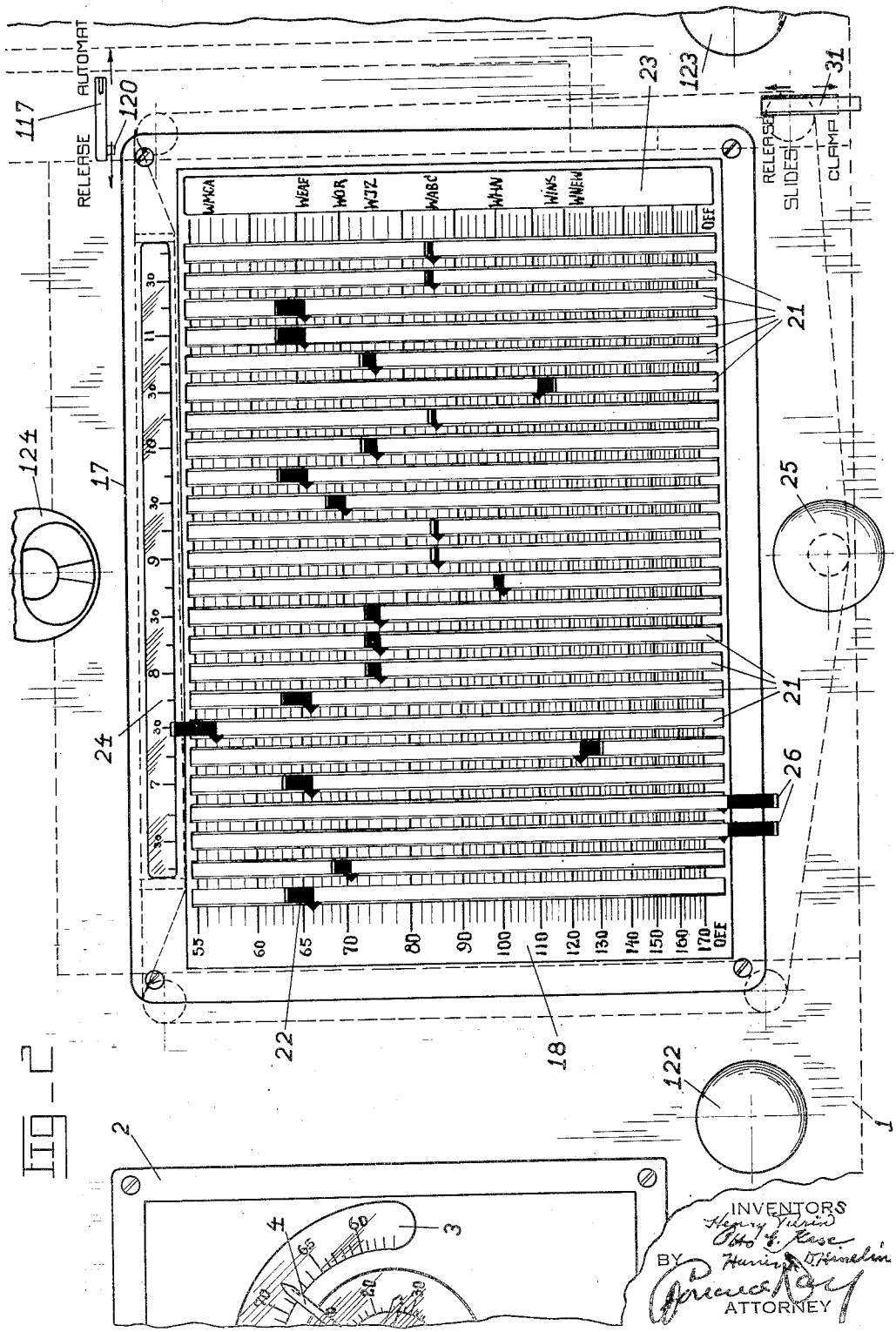

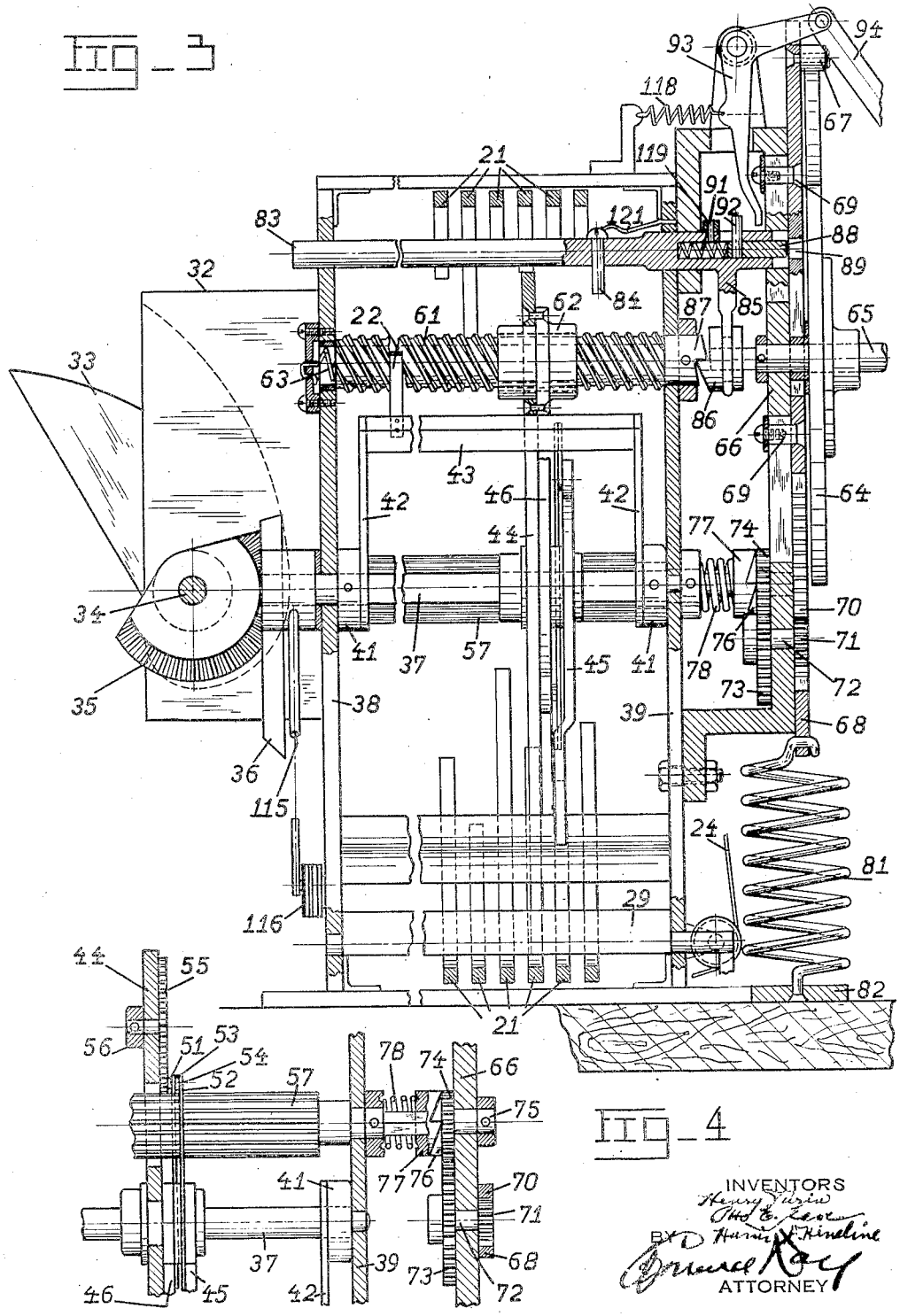

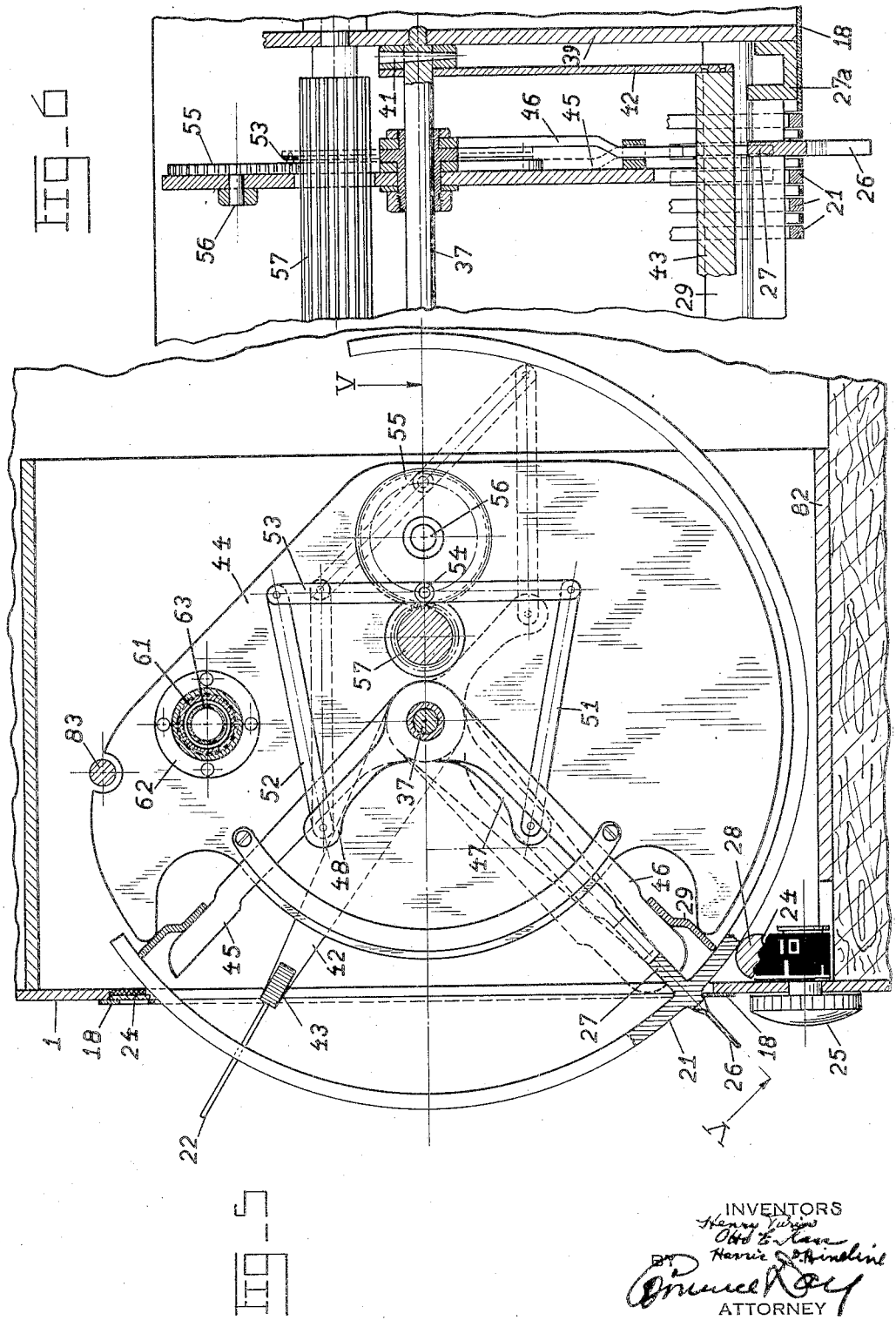

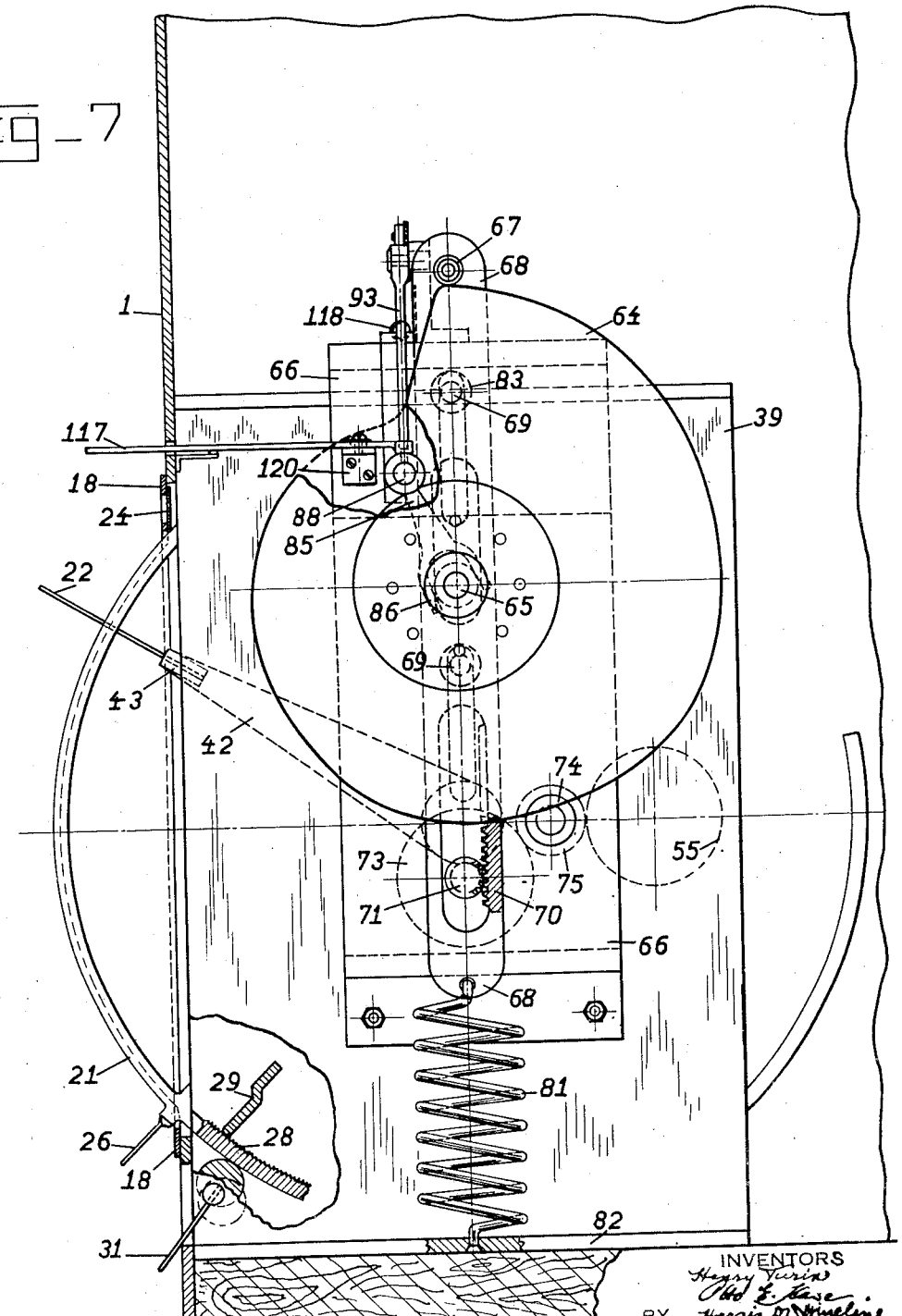

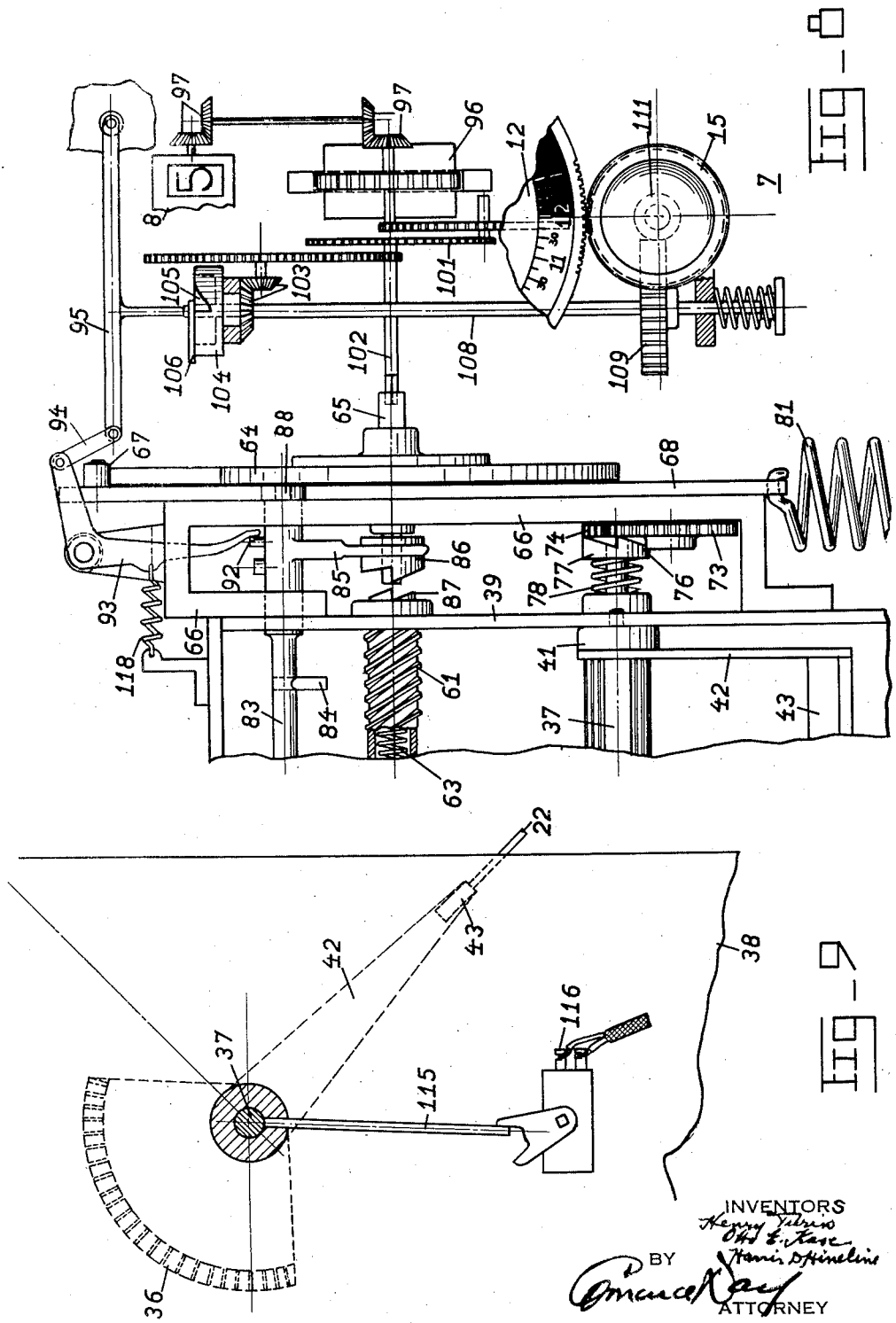

Patented July 1, 1941

2,247,455

UNITED STATES PATENT OFFICE 2,247,455

TIME CONTROLLED SETTING DEVICE

Henry Turin, Brooklyn, Otto E. Kase, New York, and Harris D. Hineline, Mount Vernon, N. Y.

Application July 14, 1937, Serial No. 153,628

2 Claims. (Cl. 250—40)

This invention relates to time controlled setting devices, and relates particularly to mechanism for adjusting a settable device into any one of several pre-selected positions of adjustment at successive time intervals. The device of the invention is especially adapted to the automatic adjustment of the tuning system of a radio receiver at successive time intervals to cause the radio receiver to receive different pre-selected frequencies, or stations, at successive time intervals; or to the tuning of the radio system to the same or different adjustments at the expiration of successive time intervals.

The device of the invention is particularly adapted to the repeated retuning of a radio set to pre-selected radio stations or programs without the intervention of an operator after the required number of pre-settable members have been pre-set, but the invention is not limited to a combination with a radio set alone, but is adapted to the adjustment of any member which is required to be moved into more than two positions at regularly recurring intervals, such as the control of steam pressure for a succession of steps in a process cycle, or for the control of a rheostat to provide successive adjusted current or voltage values over a pre-determined time schedule.

In the past there has not been available any mechanism capable of adjusting a settable member such as a dial, a shaft, or other adjustable member into a substantial number of different positions at successive pre-determined time intervals. Particularly is this true of radio sets, since no mechanism has as yet been constructed which incorporates, in a unitary device, a radio set, a plurality of settable members adapted to be pre-positioned in the desired one of a plurality of settable positions, corresponding to the tuning positions of the radio set, a time mechanism, and members for adjusting the radio tuning according to the pre-set indications at the time intervals set by the time mechanism. The nearest approach to such a mechanism has been the well-known time clock switch which provides two positions, "on" and "off," in response to the passage of consecutive time intervals. Such a mechanism is useable, and useful for turning a radio set on and off, but it fails wholly to tune the radio tuning mechanism to a pre-set or pre-required frequency, station, or program.

The present invention provides a clock controlled mechanism in combination with a plurality of settable members each adapted to be set into one of a considerable number of adjustment positions, and mechanism cooperating between the time mechanism and the settable members to adjust a movable member into the position pre-determined by the settable members at the end of a desired time interval; the invention further provides a mechanism of this character in combination with a radio set, by which the radio set is tuned to a desired station at a desired time as pre-determined by the clock mechanism and the pre-setting members. The invention further incorporates mechanism for tuning and starting the radio set simultaneously, and mechanism for stopping the radio set at the end of one or more pre-determined intervals.

Thus the invention broadly consists of a mechanism containing a plurality of pre-settable slide members adapted each to be set in a desired one of a considerable number of setting positions. These slide members cooperate with an adjustable member connected to the device which is to be set according to the pre-set schedule in a series of successive positions, and with mechanism coacting successively at the expiration of successive time intervals, with successive ones of the settable slide members to move the adjustable member (which may be a radio tuning system) into the desired successive positions at successive time intervals, as pre-determined by the prior positioning of the settable slide members, the setting action being determined and controlled by a time controlled actuating mechanism. The invention is further adapted to obtain from a time mechanism such as a clock, the necessary operating motions and driving power for the successive settings as required by the pre-set slides at the successive intervals.

The invention is particularly applicable to a radio broadcast receiver for the purpose of shifting the tuning of the radio from station to station, or from frequency to frequency as different stations present preferred programs. The shifting from station to station occurs at intervals coinciding with the termination of one program and the initiation of another program. The mechanism of the invention for this purpose desirably consists of a radio receiver having a tuning system preferably consisting of a gang condenser having a single operating shaft. In combination with the tuning system there may, if desired, be provided the usual indicating dial and, if desired, the usual tuning mechanism. There is also provided a group of settable slides, each slide being adapted to cooperate with a graduated and indexed member to show the position of the settable slide member, each slide having an index member which is set in a desired position according to the setting of the slide. There is also provided a movable member, and means for bringing the movable member into coincidence successively with the successive indexing fingers. There is also provided a driving mechanism operating in conjunction with the movable member to bring it into coincidence with the successive index fingers. By this construction the operator of the radio set may pre-select the several programs to which he desires to listen by referring to a radio program schedule, each of the settable slides being adjusted according to the indexing for the desired station and program at the successive time intervals. The time clock mechanism then retunes the radio system as the successive time intervals pass, without further attention from the user. The number of pre-settable slides may vary according to the number of successive time intervals over which the radio set is to be repeatedly tuned. A convenient number of slides is twenty four and a convenient time interval between successive tunings is fifteen minutes, thereby providing automatic, pre-set, tuning over a time interval of six hours.

Each of the pre-setting slides conveniently has a reference mark which cooperates with graduations upon an escutcheon plate to permit of the setting of the slide according to the pre-determined tuning adjustment. Each slider has an indexing pointer adapted to cooperate with an adjusting bar, the adjusting bar being adapted to cooperate with all of the indexing fingers at successive intervals. The adjusting bar is coupled to the radio tuning system and is brought into register with the indexing fingers from whatever position it may have occupied previously by the oepration of "scissors" members or squeeze bars, which in turn are actuated by a link and lever system from a drive shaft and power bar. The power bar is actuated by a cam which is desirably driven by a clock mechanism such as an electric synchronous clock, the cam being driven by the clock at such a rate of speed as to make one revolution during the time interval between successive tuning intervals. The "scissors" members are carried upon a transfer plate which is moved from indexing slide to indexing slide by the same clock or power source during the interval between successive tuning operations.

A further portion of the invention consists of a clock actuated mechanism for unlocking the drive mechanism at a pre-set or pre-determined time of the day to initiate the first tuning operation of the radio and to start the operation of the radio system, as by turning on the current supply thereto.

The automatic tuning mechanism is adapted to control the radio tuning circuit device only during the relatively few moments required for the actual re-tuning operation, and leaves the tuning system free for ordinary manual operation by an auditor during the whole of the intervening time interval. A convenient embodiment of the invention also utilizes for the manual tuning a lever member adjacent to, and closely similar in appearance to, the pre-setting slides.

The invention further conveniently utilizes an electric switch associated with the tuning mechanism in such a way that when the tuning mechanism is thrown to one end of the tuning range, the radio set is shut down by a disconnection of the power and conversely the radio set is energized when it is tuned to any desired station.

Thus an object of the invention is to pre-set the successive adjustments of a mechanical system and cause the pre-set settings to be reproduced in the mechanism system at consecutive successive intervals.

Another object of the invention is to pre-set the tunings of a radio receiver system for a plurality of different station programs, and thereafter tune the radio mechanism automatically to the pre-selected program stations.

A further object of the invention is to pre-set the stations to which a radio system is to be tuned over a plurality of time intervals; to start the operation of the radio system at the beginning of the desired time interval, and to tune the radio system to the desired pre-set program stations at the successive pre-determined intervals without other manual intervention than the pre-setting of the selecting members.

Still another object of the invention is to energize a radio receiver at a remote time interval, simultaneously to tune the radio set to a pre-selected station automatically, thereafter at successive intervals to re-tune the radio system automatically to other program stations, at the end of the pre-set program sequence to de-energize the radio set, and then or subsequently to arrest operation of the automatic re-tuning mechanism.

Other objects and structural details of the invention will be apparent from the following description when read in connection with the accompanying drawings, wherein Fig. 1 is a view in front elevation of a radio set embodying the device of the invention;

Fig. 2 is a view in front elevation of the pre-setting and control members of the device of the invention;

Fig. 3 is a view in vertical section of the tuning condenser system of the radio set, the pre-setting slide members and the mechanism cooperating for the adjustment of the tuning condensers;

Fig. 4 is a top view of the driving mechanism, operating between the power rod and the adjusting mechanism;

Fig. 5 is an end view of the setting slides and cooperating members, including the setting bar, "scissors levers," actuating links, lever and gears;

Fig. 6 is a top view partly in section of the tuning actuating members, taken on line V—V of Fig. 5;

Fig. 7 is an end view partly in section showing the actuating cam member, the power bar and the tuning adjusting members;

Fig. 8 is a front view partly in section, partly diagrammatic, of the actuating mechanism, and a clock controlled starting mechanism;

Fig. 9 is an end view of the power control switch, and

Figure 1:
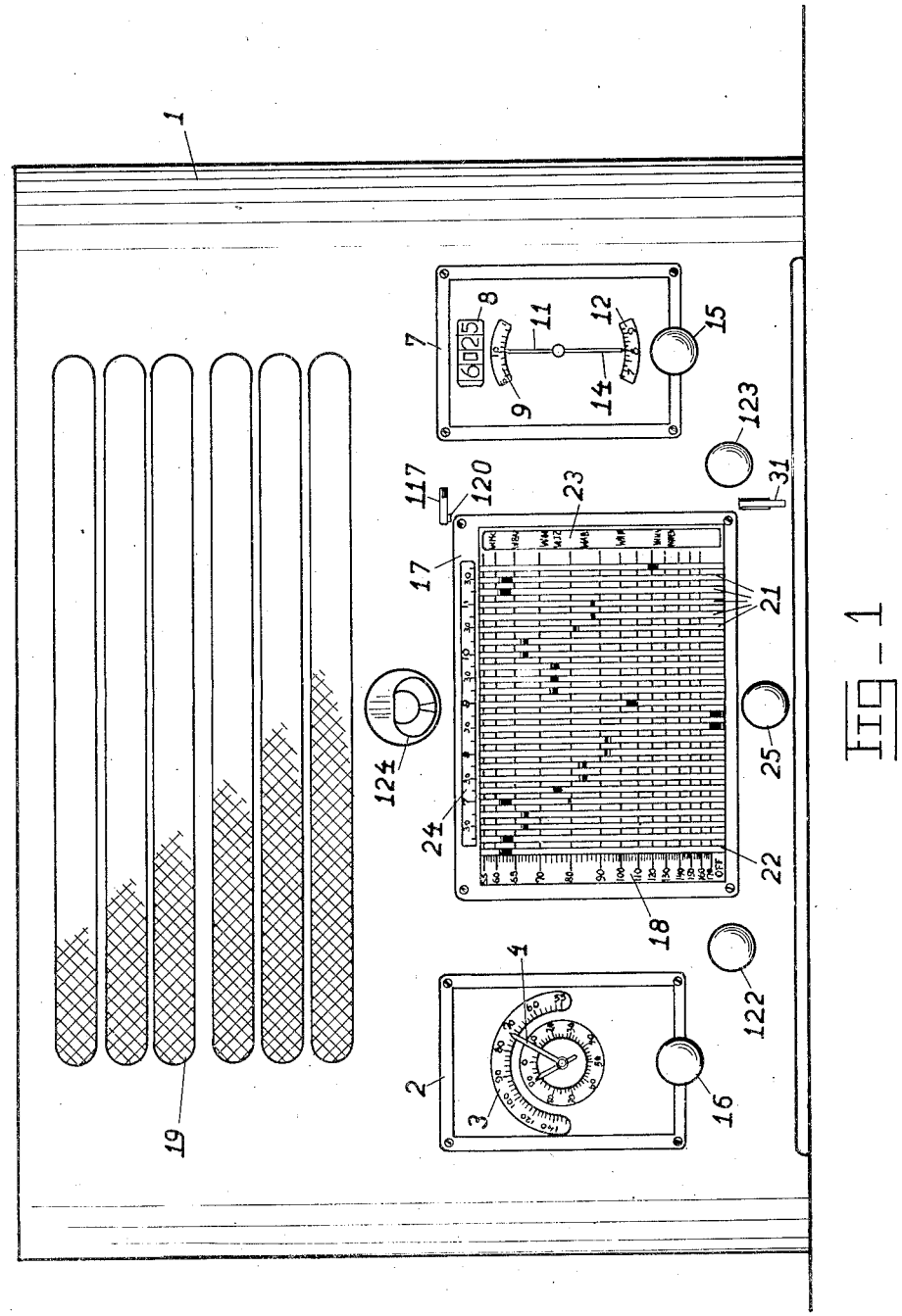

Referring to Fig. 1, the device of the invention desirably consists of a case or cabinet member 1 which desirably houses the radio mechanism including the tuning circuits, the amplifier tubes, and the loud speaker. In the front of the case or cabinet member 1, there is provided a tuning dial 2 which may conveniently have a wave length scale 3 and a cooperating pointer 4 to indicate the tuning of the radio set and may also conveniently have a micrometer tuning mechanism as shown. The dials may also be graduated for short wave settings if the circuits are adapted to the reception of short wave signals. There is also provided a clock member 7 which may take any desired form, but is shown in Figs. 1 and 8 as having a counter mechanism 8 to indicate hours and minutes and a rotating dial mechanism 9 and pointer 11 to indicate seconds. There is also provided a time setting dial 12 and a pointer 14 for setting and indicating the time at which the radio set is to be energized for beginning operation. The dial 12 is desirably graduated into a twenty-four hour scale, the afternoon and evening portion being indicated by an appropriate coloration, and is connected to the knob 15 for the purpose of presetting and adjusting the time at which the radio set is to be started. A similar knob 16 may be utilized for the manual adjusting of the tuning system of the radio and the pointer 4.

Between the dial 2 and the clock 7 there is provided the pre-set tuning control mechanism 17. This mechanism may conveniently consist of an escutcheon plate 18 having graduations thereon as shown, the graduations being conveniently in kilocycles, and being in part at least extended horizontally across the bulge of the escutcheon plate 18. Above the members 2, 7 and 17, the usual loud speaker grill 19 is provided behind which the loud speaker member of the radio set may be positioned.

Referring to Fig. 2, the escutcheon plate 18 and the graduations thereon, cooperate with a plurality of pre-setting slides 21, which may conveniently be present to the extent of approximately twenty-three or twenty-four in number. In addition, a manual tuning lever 22, cooperating with the same graduations on the escutcheon plate 18, is provided. It will be observed that the base portion of the escutcheon plate 18 is flat and square and adapted to be attached to the front of the radio cabinet. The central portion of the escutcheon plate 18 preferably has a cylindrical contour, a bulge, which is approximately one-fourth of a complete cylinder. At one end of the cylindrical portion of the escutcheon plate 18 there is provided a station log plaque 23 upon which the available stations may be marked for reference to simplify the tuning. At the top of the escutcheon plate 18 there is provided a time indicator band 24 graduated according to the hours of the day and night, the night portion being indicated by appropriate coloration. The band is movable by a manually rotatable knob member 25. As shown in Fig. 2, the setting slides 21 are mounted in slots in the cylindrical portion of the escutcheon plate 18, and either the base of the setting handle portion of the slides 21, or a reference mark on the slide is utilized for coincidence with the graduations upon the escutcheon plate 18, to set the slides in proper position.

The pre-setting slides 21 preferably take the form of portions of a circle, or part rings as is particularly well shown in Fig. 5. Each of the setting slides 21 has a setting handle 26 and an indexing finger 27.

The slides 21 are held in the desired position by means of a cam shaped clamping member 28, as is particularly well shown in Fig. 7, which extends across all the slides 21 and presses them against the cross-bar 29, the cross bar being attached to and supported by the frame members. Thus, when the clamping member 28 is rotated by the lever 31, the slides 21 are released and may be moved to the desired position, and upon return of the lever 31 to its lower position, as shown in Fig. 7, the slides 21 are clamped firmly against the member 29 and thereby held in their desired position. The clamping member 28 may conveniently have a stout spring to return it to holding position when released, but such a spring is not necessary, since reliance may be placed upon the return of the lever 31 to clamping position by the user when the slides 21 are pre-set.

The usual tuning members of a radio circuit are the several variable condensers and inductances which form the resonant circuit elements. The condenser members, as shown in Fig. 3, are usually the adjustable elements of the resonant circuits, the condenser stators being indicated at 32 and the condenser rotors at 33. The several rotors are mounted upon a shaft 34 upon which the pointer 4 is also mounted, to indicate the position of the condenser rotors, and the frequency to which the circuits are tuned.

Any desired type of manual tuning means may be provided to cooperate with the shaft 34, such a tuning mechanism being desirably actuated by the knob 16. The shaft 34 is preferably carried in bearings in proper relationship to the stator members 32, and desirably has mounted thereon a gear, or gear sector, 35, which serves for the connection between the tuning condenser members and the automatic tuning control mechanism 17.

A second gear 36 is provided meshed with the gear 35 and carried upon the auto-setting shaft 37, as is particularly well shown in Fig. 3. The shaft 37 is mounted in bearings in the end plates 38 and 39, and has attached thereto a pair of hubs 41 carrying bracket members 42. Between the brackets 42, there is provided a bar member 43 as a "setting bar." The lengths of the brackets 42 are such as to bring the bar 43 adjacent the indexing or setting fingers 27, but sufficiently far therefrom to pass them without interference. A two to one ratio may be provided between the gears 36 and 35 to cause the shaft 34 and condenser rotors 33 to make approximately one-half revolution during one-fourth revolution of the shaft 37 and bar 43. Accordingly, as shown in Fig. 5, the bar 43 and manual tuning lever 22 travel from the top of the escutcheon plate 18 to the bottom in tuning the condenser members 32—33 over the maximum tuning range, and the position of the bar 43 is determined by the frequency at which it is desired that the radio set be tuned.

A carrier plate 44 is provided for the setting actuating member, supported in part upon the shaft 37. Upon the plate 44 there is positioned a pair of "scissors members" or set levers 45 and 46. These "scissors members" are longer than the brackets 42 and long enough to cooperate with the respective setting fingers 27. Each of the levers 45 and 46 is made in elbow lever form with the lever extensions 47 and 48, as shown in Fig. 5. To the members 47 and 48 there are respectively attached a pair of link members 51 and 52 which are also respectively attached to the opposite ends of a floating lever member 53. The floating lever 53 is pivoted at its mid-point on a pivot 54 which is carried upon a gear member 55, which in turn is mounted upon a bearing shaft 56 supported on the plate 44. The gear member 55 meshes with a pinion rod 57, as is particularly well shown in Figs. 5 and 6. Thus rotation of the gear shaft 57 will rotate the gear 55, move the floating lever 53 to pull the links 51 and 52 and swing the levers 45 and 46 into engagement simultaneously with a setting finger 27 and the bar 43, the movable bar 43 thereby being moved into register with the fixed position of the setting finger 27.

The plate 44 is in part carried also by a feed screw tube 61, as is particularly well shown in Figs. 3 and 5. The feed screw tube 61 cooperates with a nut 62, which is attached to the plate 44, as is particularly well shown in Fig. 3. The pitch of the feed screw 61 is conveniently made such that one revolution of the screw advances the nut 62 and the plate 44 by an amount equal to the distances between centers of the setting slides 21. The feed screw tube 61 is journaled in bearings in the end-plates 38 and 39 and contains within its barrel a spiral spring 63, as is particularly well shown in Fig. 8. This spring is attached at one end to the feed screw tube 61 and at the other end to the frame plate 38. The spring 63 is desirably given several turns at the time of installation in order to provide a substantial torque tending to rotate the feed screw 61 to bring the plate 44 to the left hand end of the series of setting slides 21. Thus, the levers 45 and 46 are adapted to be brought into cooperation with the bar 43 and with the successive indexing fingers 27 at successive feedings of the plate 44 produced by the rotation of the feed screw 61.

The pinion shaft 57 is driven from a cam and power rod structure, as is particularly well shown in Fig. 7. The cam 64 is desirably mounted upon a shaft 65, which is rotated by a convenient source of power such as a shaft 102 from a synchronous electric clock. The shaft 65 and cam 64 are rotated once during each time interval desired to elapse between successive automatic settings of the mechanism. The shaft 65 is desirably journaled upon a frame member 66, as is particularly well shown in Fig. 3. A rotating follower member 67, cooperating with the cam 64, is provided and mounted upon a power rod 68. The power rod 68 is guided by pins 69 working in slots in the frame 66, a slot being also provided in the power rod 68 for passage of the power rod over the shaft 65.

At the bottom of the power rod 68 there is provided a rack 70 cooperating with the pinion 71 upon a shaft 72. The shaft 72 also carries a gear 73 which meshes with a pinion 74 upon a shaft 75, also carried in the frame member 66, as is particularly well shown in Fig. 4. The pinion 74 carries a single jaw clutch 76 engaging a similar single jaw clutch 77 mounted upon a squared portion of the pinion shaft 57 and spring pressed into engagement with the jaw 76 by a spring 78. Thus, downward movement of the power rod 68 will rotate the pinion 71 clockwise, the pinion 74 counter-clockwise and the pinion shaft 57 counter-clockwise to rotate the gear 55 in a clockwise direction and actuate the link and lever members as previously described. A power spring 81 is attached between the bottom of the power rod 68 and the bottom plate member 32, as is particularly well shown in Figs. 3 and 7.

Cooperating with the plate 44 is a stop rod 83 which is adapted to slide in the end-plates 38 and 39. The stop rod 83 is provided with a stop actuating pin 84 which is struck by the plate 44 at the end of its forward travel. The stop rod 83 carries a fork member 85 which engages with the movable member 86 of a single jaw clutch member which is mounted upon the inner end of the clock shaft 65, as shown. Thus, when the movable jaw 86 is engaged with the jaw 87 carried by the feed screw tube 61, the feed screw is rotated once for each revolution of the shaft 65 and when the clutch member 86 is disengaged by the fork member 85, the feed screw 61 is rotated backward by the spring 63 to return the plate 44 to the beginning of its travel. The stop rod 83 has in its right hand end a lock pin member 88 which engages with a hole 89 in the power rod 68. The pin 88 is pressed forward by a spring 91, and has a restoring pin 92. Cooperating with the restoring pin 92 is a clock-actuated lever 93 which serves to withdraw the pin 88 from the hole 89.

The lever 93 is actuated by a link member 94 attached to a lever member 95 which in turn is actuated by the clock mechanism 7.

The clock portion of the device desirably consists of a synchronous clock motor 96 driving a train of gears 97 and a counter mechanism 8 which serves to indicate the time of day. A second train of reduction gearing 101 drives a shaft 102 which engages with and drives the clock shaft 65, as previously described, and also through another reduction gearing 103 drives a notched cup member 104.

The gear ratio between the clock motor 96 and the cup 104 is made such that the cup 104 rotates once in twenty-four hours. The cup 104 has in its rim a notch 105 which cooperates with a finger member 106. The finger 106 is mounted upon a rod 108 which is free for up and down movement to raise and lower the lever 95. The rod 108 carries the gear member 109, which meshes with a pinion 111 which in turn is rotated by the setting knob 15, as is particularly well shown in Fig. 8, according to the dial 12.

The shaft 57 and gear 56 also carry a shut off rod 115 (as shown in Fig. 9), which cooperates with a switch mechanism 116, the switch 116 being connected in the power supply circuit of the radio receiver mechanism.

A shut off and re-set lever 117 is also provided (as shown in Fig. 7), and journaled upon a bracket 128 mounted upon the frame plate 39. This lever engages with a pin 119 which is attached to the stop bar 83 thereby enabling the user to move the stop bar 83 by movement of the lever 117.

In the operation of this device the user may tune the radio set manually by movement of the knob 16 or by movement of the tuning lever 22, without interference from any of the several automatic members of the automatic setting mechanism above described; the first movement of the tuning knob 16 or tuning lever 22 serves to move the lever 115 to close the radio circuit through the switch 116. Thus the radio receiver is in condition for manual actuation at any time regardless of the operation of the automatic tuning features.

Alternatively, the user may desire that the radio set be turned on at a later time in the day than the present, that it be tuned at that time to a specific station or program, and that the tuning be changed from time to time as the programs change, to select desired programs from the available programs on the various available stations, and to arrange for the reception of desired combinations of programs. For this purpose the automatic tuning features are utilized. The user may refer to a program schedule such as is printed in the daily or weekly journals, or as given out by various advertisers, and select the desired series of programs.

From the schedule the user may note the time of the beginning of the first of the desired programs and may adjust the dial 12 by means of the knob 15 to bring the figures upon the dial representing the desired starting time underneath the pointer 14. Thereafter he may move the knob 25 to bring the time band 24 into corresponding position, such that the time band shows the desired starting time over the first of the setting slides 21. Reference to the schedule will then show the frequency of the desired first station, and the first setting slide 21 is ready to be set. The lever 31 is then moved upward to release the setting slides 21, the first slide 21 is adjusted to bring the index line thereon into coincidence with the graduation upon the escutcheon plate 18 showing the frequency of the desired radio station. If, as is convenient for radio purposes, the clock shaft 65 makes one revolution in fifteen minutes, a second setting of the tuning may be obtained fifteen minutes after the start and accordingly the second setting slide 21 may be adjusted. If the initial program has a length of one-half hour, the second slide 21 is adjusted to the same reading as the first slide 21 in order that no change in tuning may occur at the end of the first fifteen minutes. Thereafter the third slide may be adjusted to the frequency of the desired station for the third fifteen minute interval and this procedure may be continued until the necessary number of slides for the desired number of programs have been set. At the close of the desired series of programs, as indicated by the time band 24, the slide 21 for the time period following the desired programs may be brought to the "off" position at the bottom of the escutcheon plate 18 and all slides for subsequent intervals may likewise be brought to the same "off" position, or if additional programs after the first series are desired, subsequent slides may be set for the desired stations. When all of the slides are set the lever 31 is restored to its lowest position and the device is fully set for the desired series of stations and may be left unattended for the desired length of time preceding the selected programs.

The clock motor 96, being connected to an electric current supply, runs in the fashion characteristic of the synchronous clock motor, thereby driving the clock counter mechanism 8 and showing the time in the normal manner. Simultaneously, the clock drives the gear trains 101 and 103 to rotate the cup 104 under the finger 106. When the notch 105 comes under the finger 106 the finger drops downward allowing the lever 95 to move downward and the lever 93 to swing in a clockwise direction as shown in Fig. 8.

The freeing of the lever 93 by the clock mechanism allows the spring 118 to pull the lower end of the lever 93 against the pin 92. This action may occur at any convenient time during the fifteen minutes preceding the desired initial program, but no further action occurs because of the friction grip exercised by the hole 89 in the power rod 68 upon the lock pin 88, which is held against movement by the "shear pressure" of the power slide produced by the spring 81. However, at a time point near the beginning of the desired program, the rotation of the cam 64 lifts the follower 67 and the power rod 68 slightly, thereby freeing the lock pin 88 and permitting it and the stop rod 83 to be moved to the left by the lever 93 under the urge of the spring 118 thereby engaging the clutch 86 to drive the feed screw 61. At the beginning of the desired program interval the cam follower 67 slides down the face of the cam, as shown in Fig. 7 and the power rod 68 moves downward under the urge of the spring 81, thereby rotating the pinion 71, the gear 73, the pinion 74, the clutch members 76 and 77 and the pinion shaft 57, as is particularly well shown in Figs. 4, 7 and 8.

The rotation of the pinion shaft 57 rotates the gear 55 in a clockwise direction, as is particularly well shown in Fig. 5. The rotation of the gear 55 carries the pin 54 and the link 53 upward and towards the right thereby applying traction to the links 51 and 52. These in turn rotate the elbow levers 45—47 and 46—48 respectively in counter-clockwise and clockwise directions about the axis of the shaft 37. The free ends of the levers 45 and 46 then swing towards each other freely until one or the other strikes an obstacle, which may be the index finger 27 of the first slide 21, or may be the setting bar 43. Whichever lever first strikes one of these two members is thereupon arrested in its position, arresting the corresponding link 51 or 52 and the associated end of the lever 53. The other of the levers 45 or 46, being, however, still free to move, the link 53 tilts and movement continues until the second of the levers 45 or 46 also strikes an obstacle. At this point in the setting cycle one of the levers is in contact with an index finger 27, and the other is in contact with the setting bar 43. At this stage the lever in contact with the index finger 27 is held in its position, since the setting slide is clamped rigidly in position by the cam member 28. However, the tuning system is movable, although under somewhat of a friction load. Accordingly, the spring 81 continues to move the pinion rod 57 as before described and the lever 45 or 46 which is in contact with the setting bar 43 pushes the bar ahead of it until it is brought into register with the index finger 27, which occurs when the levers 45 and 46 have completed their travel as occasioned by one-half revolution of the gear 55. It will be observed that it is immaterial where the index finger 27 is positioned over the available quadrant of movement, since the position at which the two levers come together in contact with opposite sides of the index finger 27 merely determines the tilt of the lever 53 to one side or the other of the vertical as is shown in the dotted lines in Fig. 5.

The procedure thus brings the setting bar 43 into coincidence with, or into register with, the index finger 27 upon the first setting slide 21, thereby moving the brackets 42, the shaft 37, the gear 36, the gear 35 and the condenser shaft 34 to set the condenser rotors 33 at the proper position to tune the radio receiver circuit to the desired station.

Simultaneously the movement of the setting bar 43 moves the manual setting lever 22 along the graduations on the escutcheon plate 18 to indicate the radio frequency, and the station, to which the receiving circuits are tuned. Reliance may be placed upon the position of the manual tuning lever 22 to show the condition of the tuning system; or the usual dial 2, as previously described, may be utilized to indicate the station tuning.

Also the movement of the bar 43 and its associated members, including the gear 36, moves the control rod 115 (Figs. 3 and 9) to close the switch 116, thereby supplying current to the radio mechanism for initiating reception. These steps occur during the first half of the downward movement of the power rod 68, and during the first revolution of the pinion shaft 57. During the remaining half of the movement of the power rod 68 and the second revolution of the pinion shaft 57, the lever 53 is restored to its original position and with it the links 51 and 52 and the levers 45—47 and 46—48, thereby removing them from the path of movement of the setting bar 43 and permitting a manual tuning operation immediately thereafter if desired. It may be observed that these steps of tuning and restoring occur in a relatively short time as determined by the angle of slope of the steep portion of the cam 64. The time may be made as short as a few seconds or as long as several minutes depending upon the requirements of the user.

After this initial tuning operation is completed the shaft 65 continues to rotate under the drive of the clock, and the cam 64 is rotated during the subsequent time interval to raise the power rod 68 to its highest position. The upward movement of the power rod 68 rotates the gear 71 and 73 in counter-clockwise direction and the gear 74 in clockwise direction. This movement occurs relatively slowly and occupies substantially all of the interval between successive automatic tunings. It is, however, desirable that the automatic tuning mechanism be free from interference with manual tuning, and accordingly, for this purpose, it is essential that the levers 45 and 46 be in their position of maximum separation during the entire time interval between automatic tunings. This requirement necessitates maintenance of the gear 55 and the associated linkage, as well as the pinion rod 57, stationary during the intervals between automatic tuning operations. This is attained by the operation of the clutch members 76 and 77, which permit the gear 74 to rotate backward without moving the pinion shaft 57. It is, of course, obvious that some backward torque is applied to the pinion shaft 57 tending to move it from its zero position, but under normal conditions the friction load of the shaft and its connected members is sufficient to hold it stationary and permit rotation of the clutch jaw 76. Alternatively, a light detent member such as a click spring may be applied to the pinion shaft 57, or a separating spring of suitable character may be applied between the levers 45 and 46 to hold the assemblage in its proper non-interfering position.

During this continued rotation of the cam 64 to raise the power rod 68 and tension the spring 91, the clutch members 85 and 86 are engaged, and thus, simultaneously, the rotation of the shaft 65 rotates the feed screw 61, the pitch of the feed screw 61 being such that one revolution advances the plate 44 by a distance equal to the spacing between centers of the successive slides 21. Accordingly, at the end of the first time interval, which may conveniently be fifteen minutes when the mechanism is applied to a radio receiver, the "scissors" levers 45 and 46 are in a position to cooperate with the second index finger 27 on the second setting slide 21. Thereafter the previously described series of tuning operations is repeated. If the first and second setting slides 21 are set for the same station, the second operation merely closes the levers 45 and 46 upon the setting bar 43 and the second index finger 27. If, however, the second slide is set for a different station, the setting bar 43 is moved accordingly.

This series of operations is then cyclically repeated at the successive time intervals until the end of the desired program series is reached. This may occur after fifteen minutes or after six hours in the embodiment above described. If the end of the desired series of programs occurs within less than six hours, the setting slide 21 for the next time interval after the end of the desired program series is moved to the bottom of its sector into the "off" position. Thereupon at the beginning of the next time interval, occurring after the desired program is completed, the same cycle of operations occurs as before described to move the setting bar 43 into "off" position, thereby causing the lever 115 to engage with the switch 116 and shut off the energizing current supply to the radio.

It is to be observed, however, that this procedure, while it stops the operation of the radio mechanism, does not arrest the cyclic movements of the automatic tuning mechanism. Accordingly all of the setting slides 21 for subsequent time intervals may be set in the "off" position; or if the original program series occupied less than six hours and additional stations are desired after a silent interval, but within the six hour period, the appropriate setting slides 21 for the desired subsequent program times as indicated by the time band 24, may be set for the desired stations and the desired programs received. In any event, at the close of the six hour period a fixed index finger 27—A, in the "off" position (shown in Fig. 6) is encountered by the levers 45 and 46, and the radio circuits de-energized by the opening of the power switch 116, resulting from movement of the setting bar 43 into "off" position, the finger 27—A being permanently set in the "off" position.

During these successive cycles the plate 44 is advanced along successive setting slides, until the final, fixed, index finger 27—A is reached, at which time the setting bar 43 is brought to its lowermost, or "off" position, and the radio set disconnected at the end of the six hour period.

Continued movement of the clock shaft 65 continues the turning of the feed screw tube 61 through the clutch members 86 and 87, until the plate 44 is caused to contact with the stop pin 84, and move the stop rod 83 towards the right, as is particularly well shown in Fig. 3. The full movement of the stop rod 83 to the right separates the jaw members 86 and 87, and brings the lock pin member 88 against the powder rod 68. The stop rod 83 is held in its position, as moved to the right, by the detent spring 121 as shown in Fig. 3. The separation of the clutch members 86 and 87 frees the feed screw tube 61 for rotation in the reverse direction under the urge of the spring 63 to return the plate 44 to the left hand end of its travel. The exact time in the sequence of operations at which the plate 44 moves the stop rod 83 towards the right is not necessarily fixed, but the rod may be moved to the right, bringing the pin 88 against the power rod 68 at any time during the next succeeding time interval after the desired program. Thereafter when the power rod 68 is raised to the top of its travel by the rotation of the cam 64, the stop pin 88 is moved into the hole 89 in the power rod 68 by the spring 91, where it remains until it is disengaged by the lever 93, at a time determined by the setting of the dial 12 and the movement of the various clock members previously described.

As is well-known, not all stations will provide the same signal strength at a given point or on a given receiver mechanism and accordingly a desirable portion of the system of the invention is means for automatic signal-volume control. This may take any convenient form, there being a considerable number of automatic volume control circuits which are well known to workers in the radio field and described in various journals such as the issues of the Proceedings of the Institute of Radio Engineers. A common and widely used automatic volume control consists of a resistance in the circuit supplying the screen grid bias of tetrode amplifier tubes, in combination with a regulating tube taking plate power through the same resistance, to vary the voltage drop therein, and thereby vary the tube bias and the amplifying factor. Such a system also usually has an adjustable rheostat at a convenient point in the circuit to adjust the volume which is automatically maintained. Such an automatic volume control is readily included in the radio circuit associated with the tuning condenser system 33—34 and the adjusted volume may be determined by the volume control knob 122, as shown in Figs. 1 and 2.

Similarly it is on occasion desirable to exercise a certain amount of control of the relative strengths of the high frequency and low frequency tones in the audible signal and for this purpose a tone color control rheostat may be provided and operated by the knob 123.

In many instances the radio receiving system is adapted to receive signals not only over the broadcast band, but over various of the short wave bands. When this automatic tuning mechanism is applied to a radio system containing such multi-band circuits, the wave frequencies of the respective bands may be indicated upon the tuning dial 2 and also upon the escutcheon plate 18 adjacent to the frequency graduations for the broadcast band, thereby making it possible to adjust the tuning automatically not only for the broadcast band but for the various other desired bands. The switching from one band to another is preferably accomplished by a manually operable knob of the usual type, but it can be automatically accomplished if desired by the addition of appropriate setting mechanisms similar in general pattern to the off and on switch 116 shown in Fig. 9 under the control of setting slides 21, if such automatic feature is desired.

If desired the usual form of "magic eye" tuning indicator may be incorporated in the circuits and included in the cabinet structure 1 as indicated at 124.

Figure 10:
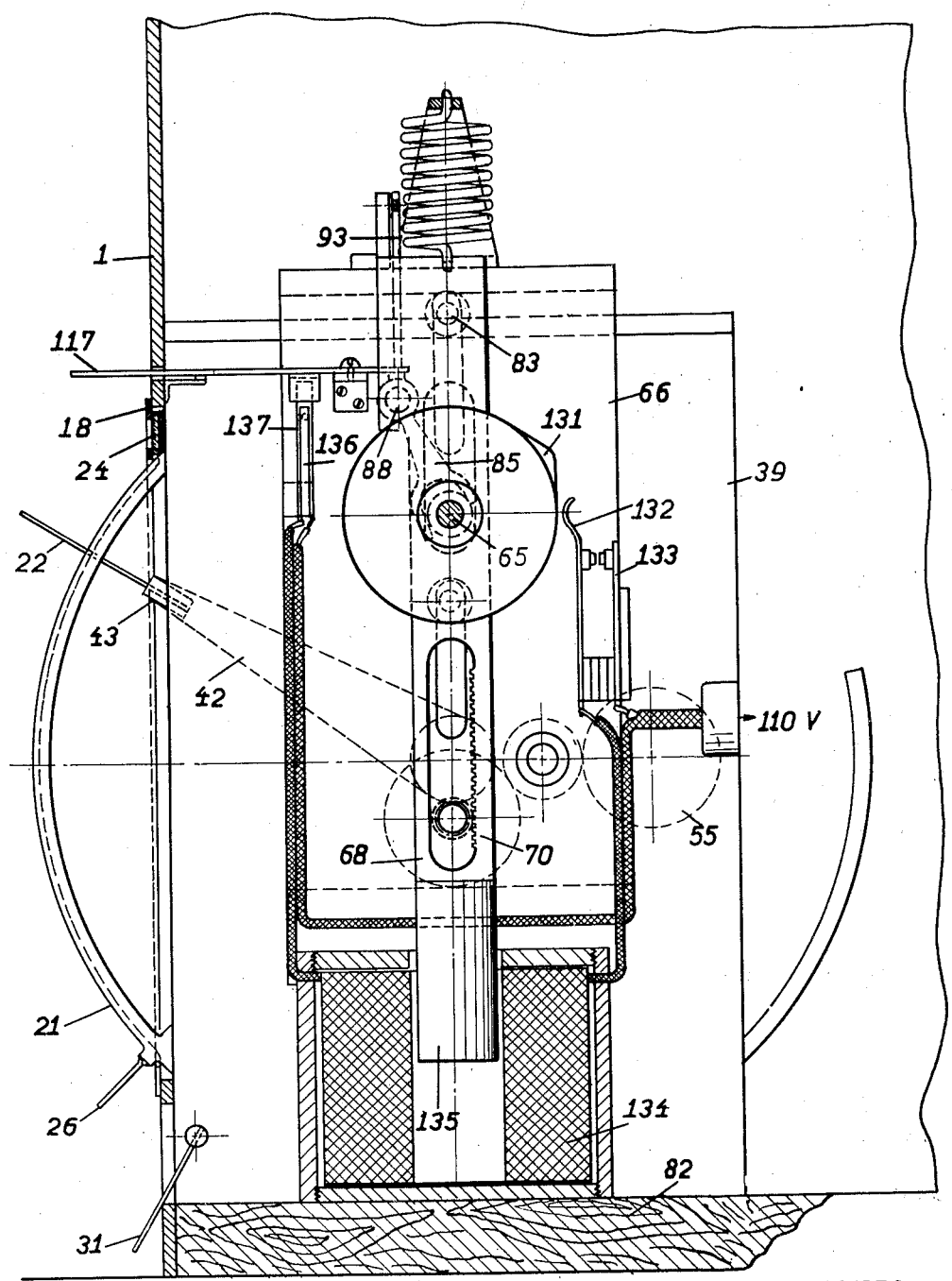
Fig. 10 is an end view of an alternative embodiment for the operation of the power bar.

The above described embodiment utilizes the power of the clock motor 96 to perform all of the automatic tuning operations. This is a particularly convenient arrangement because of the fact that a high grade motor has ample reserve power for the purpose. If, however, it is desired to use a clock motor of minimum size, the cam 64 and the spring 81 may be omitted; and instead of the cam 64 a contact plate 131 may be mounted upon the shaft 65 as shown in Fig. 10. Cooperating with the contact member 131 there is provided a pair of electric contacts 132 and 133. In place of the power spring 81 there is provided a solenoid mechanism consisting of a wire winding 134 and a core 135, the core 135 being attached to the power rod 68 which is lifted by a tension spring as shown and the solenoid being attached to the base plate 82 of the mechanism.

A second pair of contacts 136 and 137 are provided, adapted to cooperate with the stop rod 83, to keep the circuit open until the stop rod is operated by the clock into auto-release position, whereafter the solenoid winding 134 is energized by closure of the contacts. The operation of this alternative embodiment of the invention is closely similar to that previously described except that the movement of the stop rod 83 by the clock mechanism through the agency of the lever 93 closes the contacts 136 and 137, whereafter the contacts 132 and 133 are closed to energize the solenoid 134 and move the power rod 68. This in turn causes the various elements of the mechanism to perform their cycles of operation as previously described. The contacts 136 and 137 then remain closed until the end of the six hour period, at which time the plate 44 returns the stop rod 83 to off position and opens the contacts 136 and 137 to prevent further energization of the solenoid 134. It is to be observed that this embodiment of the invention requires a low resistance supply circuit to the radio since otherwise the relatively heavy current demand by the solenoid 134 produces undesirable noises in the radio circuit.

In some instances it is desirable that the radio set be not operated automatically for periods greater than twenty-four hours. For this purpose the lever 117 is provided with a locking notch 120 as shown in Figs. 1 and 2. When the lever 117 is moved along its full travel to the left and engaged in the locking notch 120, the stop rod 83 is held permanently in "off" position and is not disengaged by the clock. Accordingly, the automatic features of the tuning mechanism are prevented from functioning, and, while the clock mechanism 7 may operate in its usual and normal manner, no automatic tuning occurs. This lock mechanism is provided in order that the user of the radio set may leave it for prolonged periods without automatic operation occurring. When it is desired to resume automatic operation, the lever 117 is released from the lock notch and the previously described series of operations may then occur.

In some instances it is desired that such a limited number of programs be automatically presented by automatic tuning to the corresponding stations, as to occupy less than six hours time, and thereafter it is desired that the automatic tuning occur for another period such that the total time between the beginning of the first series and end of the second series is more than six hours. For this purpose the first series of programs may be set upon the appropriate slides 21 and the automatic tuning obtained as above described. Thereafter at any convenient time between the first series of programs and the second series within the six hour period from the beginning of the first series of programs, the lever 117 may be moved to "release" position as shown in Fig. 2. This movement disengages the clutch members 86 and 87 permitting the spring 63 to return the plate 44 to starting position. The time band 24 may then be reset to indicate the time of the beginning of the desired second program series, by bringing it into position over the first setting slide 21 and thereafter any desired number of the setting slides 21 may be set to the desired stations and the automatic tuning proceeded with as before described, either with or without automatic initiation by setting of the clock. It is to be observed that while under normal conditions the automatic tuning features are brought into operation by clock control movements, the automatic tuning can be initiated by movement of the lever 117 into automatic position. When this movement of the lever 117 into automatic position is made, the automatic features will resume operation at the beginning of the next fifteen minute interval.

The above described embodiment of the device of the invention is presented as a combination of a clock, an automatic tuning mechanism and a radio mechanism. Many other mechanisms may, however, be substituted for the radio tuning system, for instance, an adjustable rheostat may be utilized for such purposes as control of a temperature cycle in an electric furnace with the passage of time, or for any other control of cycles of operation which may be determined by a rheostat. Alternatively, the rheostat may be utilized for voltage control of a generating system, or for voltage control by means of a regulating transformer. Similarly the device may be used to adjust the setting of a temperature regulating mechanism for the direct control of temperatures according to a time cycle. The clock and setting mechanism may be combined with any mechanism which it is desired to have set into a selected one of the plurality of positions at successive time intervals.

While there are above described but a limited number of embodiments of the invention, it is possible to provide still other embodiments without departing from the inventive concept herein disclosed and it is therefore desired that only such limitations be imposed upon the appended claims as are stated therein or required by the prior art.

What we claim and desire to secure by U. S. Letters Patent is:

1. In combination, a plurality of pre-settable members, an adjusting member, means for bringing said adjusting member into register with said pre-settable member comprising a pair of swingable levers, a support plate therefor, power means for actuating said swingable levers, and means for bringing said swingable levers into adjusting relationship with said adjusting member and successive pre-settable slides comprising a feed screw, and means for releasing said feed screw comprising a stop rod having a clutch disengaging fork, a member engaging with said support plate, and a pin for locking said power means.

2. In combination, a plurality of pre-settable members, an adjusting member, means for bringing said adjusting member into register with said pre-settable member comprising a pair of swingable levers, a support plate therefor, power means for actuating said swingable levers, and means for bringing said swingable levers into adjusting relationship with said adjusting member and successive pre-settable slides comprising a feed screw, and means for releasing said feed screw comprising a stop rod having a clutch disengaging fork, a member engaging with said support plate, and a pin for locking said power means, and a clock controlled mechanism for restoring said stop rod to operating position.

HENRY TURIN.
OTTO E. KASE.
HARRIS E. HINELINE.